United States Patent
Barkan et al.

[11] Patent Number: 6,095,421
[45] Date of Patent: Aug. 1, 2000

[54] APPARATUS AND METHOD FOR SCANNING A SYMBOL USING AN INTELLIGENT LASER FOCUS CONTROL

[75] Inventors: Edward Barkan, Miller Place; Raj Bridgelall, Mount Sinai; Jean Tu, Stony Brook; Yuri Gofman, Bohemia; Joseph Giordano, Bayville; Edmond L. Fratianni, Port Jefferson, all of N.Y.

[73] Assignee: Symbol Technologies, Inc., Holtsville, N.Y.

[21] Appl. No.: 09/183,523

[22] Filed: Oct. 30, 1998

Related U.S. Application Data

[60] Continuation-in-part of application No. 08/833,650, Apr. 8, 1997, which is a division of application No. 08/269,170, Jun. 30, 1994, Pat. No. 5,672,858.

[51] Int. Cl.[7] .......................................................... G06K 7/10
[52] U.S. Cl. ................................. 235/462.22; 235/462.45
[58] Field of Search .................... 235/462.01, 462.06, 235/462.09, 462.2, 462.22, 462.23, 462.32, 462.36, 462.42, 462.43, 462.45

[56] References Cited

U.S. PATENT DOCUMENTS

| | | | |
|---|---|---|---|
| 3,684,868 | 8/1972 | Christie et al. | 250/219 |
| 3,758,782 | 9/1973 | Radforde et al. | 250/239 |
| 4,136,821 | 1/1979 | Sugiura et al. | 235/462 |
| 4,542,528 | 9/1985 | Sanner et al. | 235/462 |
| 4,734,566 | 3/1988 | Senda et al. | 235/455 |
| 4,939,356 | 7/1990 | Rando et al. | 235/467 |
| 4,963,756 | 10/1990 | Quan et al. | 235/472 |
| 5,005,086 | 4/1991 | Iwamoto et al. | 250/201.6 |
| 5,122,644 | 6/1992 | Hasegawa et al. | 235/472 |
| 5,136,147 | 8/1992 | Metlitsky et al. | 235/472 |
| 5,155,659 | 10/1992 | Kunert | 361/380 |
| 5,216,230 | 6/1993 | Nakazawa | 235/462 |
| 5,278,397 | 1/1994 | Barkan et al. | 235/462 |
| 5,291,009 | 3/1994 | Roustaei | 235/472 |
| 5,352,922 | 10/1994 | Barkan et al. | 235/462 |
| 5,506,392 | 4/1996 | Barkan et al. | 235/462 |

*Primary Examiner*—Thien M. Le
*Attorney, Agent, or Firm*—Kirschstein et al.

[57] ABSTRACT

A laser focus control system including a laser for generating a scanning light beam to visually illuminate an information encoded bar code symbol. A segmented photodiode detects light reflected from the symbol and generates a plurality of electrical signals, each signal based on the light energy incident on the segments of the photodiode, thereby representing the spatial intensity variations of the symbol. A scanning zone processor then filters, averages, and compares the electrical signals to a noise threshold, and assigns logic levels based on the comparisons. Thereafter, a scanning zone detector determines the corresponding scanning zone distance based on the combination of logic levels and determines whether the system has stabilized within the zone distance. The scanning zone distance is then furnished to the laser focus controller in order to adjust the laser focus of the scanning device. The system is incorporated in a shock-resistant hand-held device.

20 Claims, 7 Drawing Sheets

APPARATUS AND METHOD FOR SCANNING A SYMBOL USING AN INTELLIGENT LASER FOCUS CONTROL

CROSS REFERENCE TO RELATED CASES

This application is a continuation-in-part of co-pending U.S. Ser. No. 08/833,650, filed Apr. 8, 1997 still pending which, in turn, is a division of U.S. Ser. No. 08/269,170, filed Jun. 30, 1994, now U.S. Pat. No. 5,672,858.

BACKGROUND OF THE INVENTION

1. Field of the Invention

This invention generally relates to an apparatus for and a method of electro-optically reading symbols, and, more particularly, to a laser beam scanning system capable of detecting a scanning range of a bar code symbol and adjusting the focus of a scanning laser beam based on the scanning range.

2. Description of the Related Art

Optical readers and optical scanning systems for scanning and reading indicia, such as bar code symbols, appearing on a label or on the surface of an article, are commonly used. A bar code symbol is a coded pattern of graphic indicia comprised of a series of bars of various widths spaced apart from one another to bound spaces of various widths, the bars and spaces having different light-reflecting characteristics. The scanning systems electro-optically transform the graphic indicia into electrical signals, which are decoded into alphanumerical characters that describe the article or some characteristic thereof.

Generally, scanning systems include a light-emitting source, such as a gas or semiconductor laser, to illuminate the symbol with a laser beam that may be optically adjusted by an optical focus assembly, to form a beam spot of a certain size at the target distance. It is preferred that the cross section of the beam spot at the target distance be approximately the same as the minimum width between regions of different light reflectivity, i.e., the bars and spaces of the symbol.

A lens or similar optical components direct the laser light beam along a light path toward a target that includes the bar code or other symbol. A photosensor or photodetector detects the light reflected or scattered from the target bar code symbol. The photodetector is positioned in the scanner along an optical path so that it has a field of view which ensures the capture of a portion of the light reflected or scattered off the targeted bar code symbol. This captured portion of reflected light is subsequently detected and converted into an electrical signal. Electronic circuitry or software decode the electrical signal into a digital representation of the data represented by the symbol that has been scanned. For example, the analog electrical signal outputted by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the corresponding alphanumerical characters.

As previously stated, laser beam scanning systems employ a laser light beam that is directed by a lens along a light path towards a target that includes the bar code symbol. The moving-beam scanner operates by repetitively scanning the light beam in a line or series of lines across the coded symbol by motion of a scanning component, such as the light source itself, or a mirror disposed in the path of the light beam. The scanning component may either sweep the beam spot across the coded symbol and trace a scan line or pattern across the symbol, or scan the field of view of the scanner, or do both.

Scanners establish scanning distance or range finding by incorporating laser focus control techniques. These techniques, which include for example, lens changing mechanisms, slidably driven lenses, piezo-electric focusing elements, and the like, typically deploy a range information bearing signal to indicate the degree of focus adjustments.

However, without a method of intelligently making a decision as to when to adjust the focus, the scanning range response becomes sluggish and the system becomes cumbersome to use. For example, a simple method to detect scanning range would be to monitor the received signal strength of the light signal reflected from the targeted bar code symbol. In theory, because the power of the received light beam is inversely proportional to the square of the distance from the target, the further away the targeted symbol, the longer the scanning distance, and the weaker the received signal strength. Similarly, the closer the targeted symbol to the light-emitting source, the shorter the scanning distance, and the stronger the received signal strength. The level of received signal strength is related to the scanning range and may be used to adjust the focus at any given instant. This method will only work, however, if the prevailing conditions are pristine enough to ensure both consistent bar code quality and constant ambient light levels. If bar codes are printed on different substrates or contrast levels, or if ambient light levels vary, the received signal would be influenced by such variations, resulting in the impairment of the scanning range detection.

SUMMARY OF THE INVENTION

Systems and methods, consistent with the present invention as embodied and broadly described herein, include a laser for generating a scanning light beam directed along a path toward the indicia to illuminate a field of view and cause light to be reflected from the indicia. Also included is a photodetector to detect the light reflected from the targeted indicia or bar code symbol containing optically encoded information and to generate electrical signals representative of the spatial intensity variations of the bar code symbols. Further included is a scanning zone processor that processes the electrical signals by averaging, filtering, and comparing the electrical signals against a threshold and by assigning logic levels based on the comparisons. A scanning zone detector is used to detect whether the processed signals have settled or stabilized and to determine a scanning zone distance based on the processed signals. A laser focus controller adjusts the focus of the laser beam based on the scanning zone distance from the scanning zone detector.

The present invention also includes a method of detecting the light reflected from the targeted indicia or bar code symbol containing optically encoded information and of generating electrical signals representative of the spatial intensity variations of the bar code symbols. The electrical signals generated by the photodetector are processed by the electrical signals generated by the photodetector by averaging, filtering, and comparing the electrical signals against a threshold and by assigning logic levels based on the comparisons. A scanning zone distance is then determined based on the processed signals. The focus of the laser beam is then adjusted based on the scanning zone distance.

Still another feature of the present invention relates to protecting the system, especially when embodied in a hand-held housing, from shock damage in the event that the housing is forcefully laid down or dropped.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

DETAILED DESCRIPTION OF THE PREFERRED EMBODIMENTS

Figure 1:
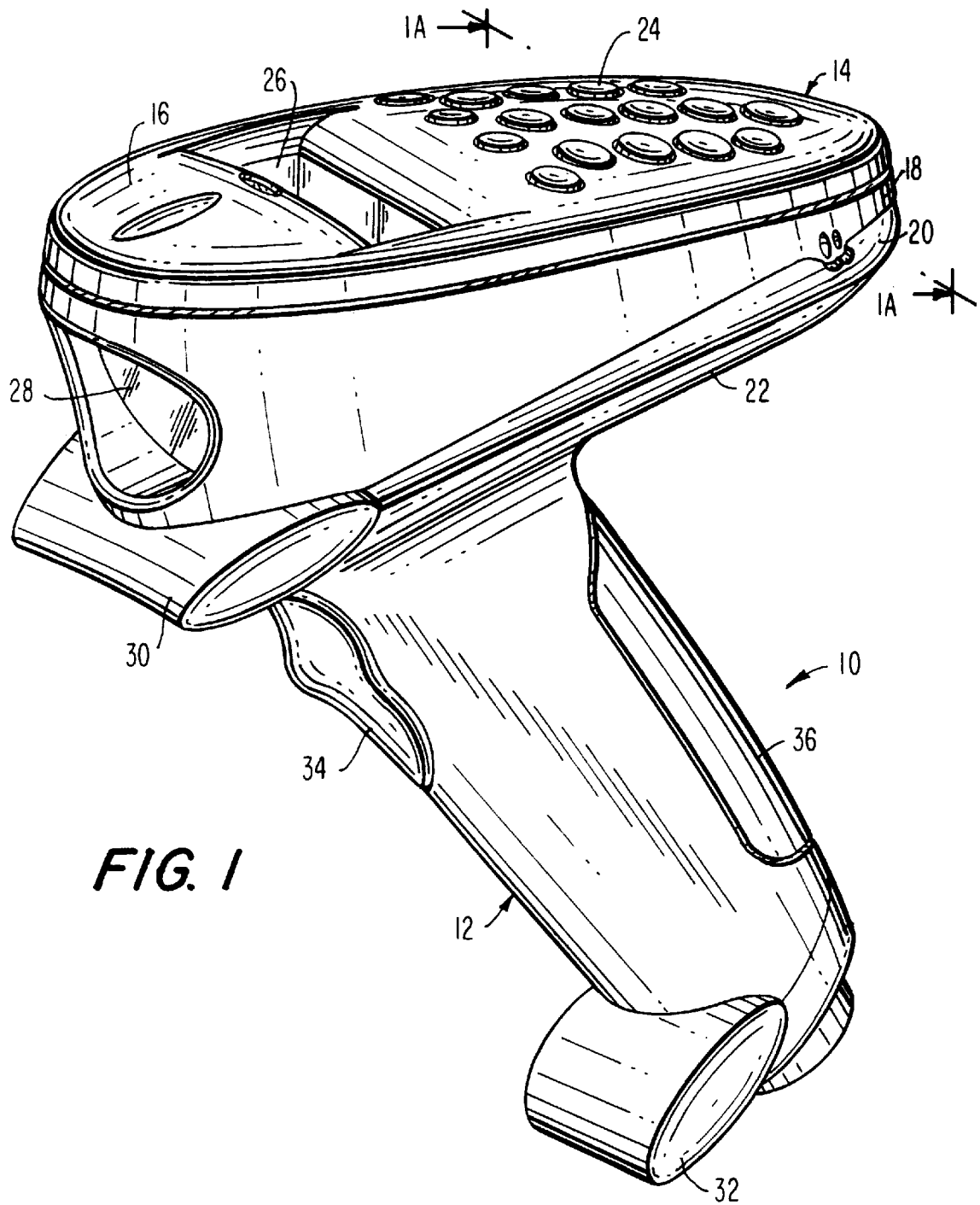
FIG. 1 shows a perspective view of a hand-held, portable laser scanning head for reading symbols according to this invention.
Figure 1A:
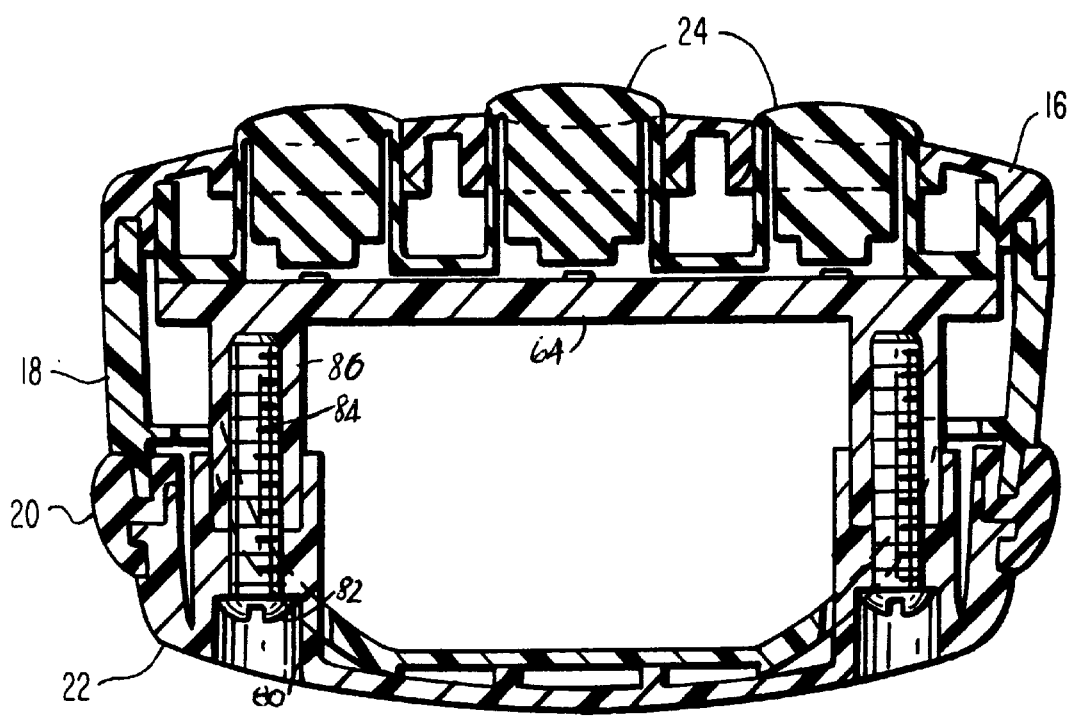
FIG. 1A is a sectional view taken on line 1A—1A of FIG. 1.
Figure 2:
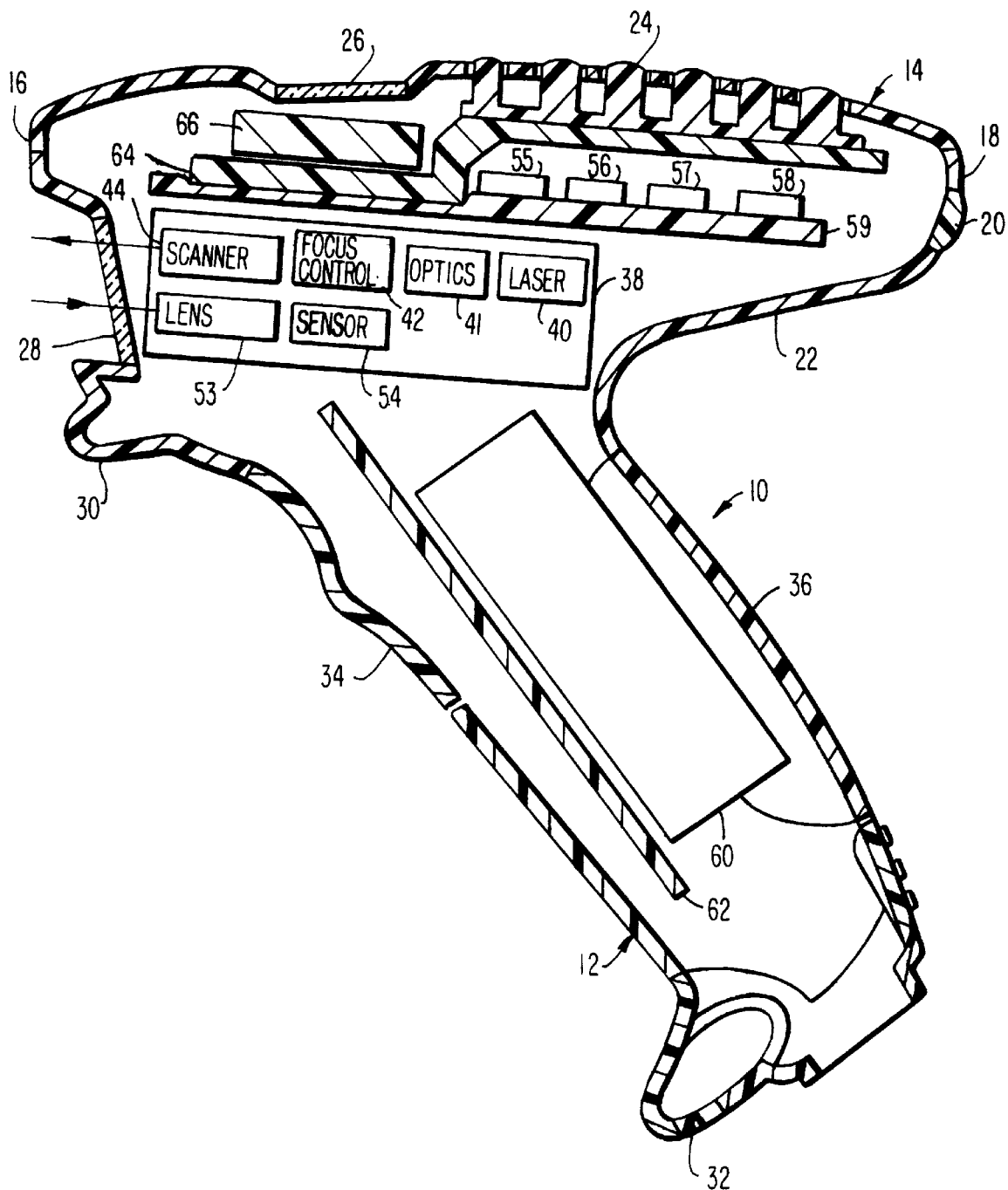
FIG. 2 shows a side sectional view of the head of FIG. 1.

As illustrated in FIGS. 1, 1A and 2, reference numeral 10 generally shows a hand-held laser optical scanning device operative for reading and scanning bar code symbols. The device 10 includes a generally gun-shaped head or housing having a handle portion 12 and an elongated barrel or body portion 14. The handle portion 12 has a cross-sectional dimension and overall size such that it can conveniently fit in the palm of a user's hand. Both the body and handle portions have parts constituted of a lightweight, resilient, shock-resistant, self-supporting material, such as a synthetic plastic material.

The body portion 14 is generally horizontally elongated along a longitudinal axis, and has an upper part or canopy 16, a middle part 18, a gasket 20, and a lower part 22 that merges into, and is of one-piece construction with, the handle portion 12. A keypad 24 is mounted on the canopy, as is a display window 26 through which data is visible. The gasket 20 is made of a hard rubber material, extends completely around the periphery of the device and bulges outwardly past the walls of the middle and lower parts.

A laser light-transmissive window 28 is mounted at the front end of the body portion. An upper footing 30, preferably made of a hard rubber material, projects forwardly of the body portion below the window 28. A lower footing 32, also made of a hard rubber material, projects forwardly of the handle portion at the lower end thereof. Both footings 30, 32 support the device 10 on a flat support surface, such as a counter top, when the device is not being held by an operator.

A trigger or manually-operative switch 34 faces forwardly of the handle portion and, when actuated, initiates scanning of a symbol to be read. At the rear of the handle portion, a rear door 36 is removable to provide access to the interior of the handle portion.

A scan engine 38, including a light source, such as a laser 40, for example, is mounted within the body portion 14, and operates to generate a laser beam. Optic elements 41 are mounted on the scan engine, and function to direct and optically modify the laser beam along a light path through the window 28 towards a reference plane located exteriorly of the housing. A target bar code symbol to be scanned is located in the vicinity of the reference plane, that is, anywhere within the depth of focus of the incident beam, and the light reflected from the target symbol constitutes reflected light from the laser beam which is directed along a return light path away from the reference plane and back towards the housing.

A high-speed scanner 44 is employed to reciprocally and repetitively oscillate the laser 40 or a scan mirror in the path of the laser beam in alternate circumferential directions over arc lengths of any desired size, typically less than 360°, and preferably on the order of 20°, and at a rate of speed on the order of a plurality of oscillations per second, typically 20–40 oscillations per second. The scanner 44 cyclically sweeps the laser beam through an angular distance over a field of view across the symbol located in the vicinity of the reference plane.

After impinging on the target bar code symbol, the light is reflected and scattered from the symbol towards the window 28. The reflected light passes through the window to an optical focusing element 53, e.g., a converging lens. The optical focusing element 53 focuses the reflected light onto a photosensor or photodetector 54. The photodetector 54 has a field of view which ensures the capture of a portion of the light reflected or scattered off the targeted bar code symbol. The photodetector 54 subsequently generates electrical analog signals indicative of the intensity of the reflected light coming from the target bar code symbol over the field of view.

A printed circuit board 59 is mounted within the body portion 14, and various electrical sub-circuits diagrammatically represented by reference numerals 55, 56, 57, 58 are provided on the board 59. Signal processor 55 operates to process the analog signal generated by the photosensor or photodetector to a digitized signal to generate therefrom data descriptive of the symbol. Suitable signal processing for this purpose was described in U.S. Pat. No. 4,251,798. Sub-circuit 56 constitutes drive circuitry for the scanner 44.

A decode module 57 processes the digitized signal generated in the head, and calculates the desired data, e.g., the multiple digit representation or code of the symbol, in accordance with an algorithm contained in a software program. The decode module 57 includes a PROM for holding the control program, a RAM for temporary data storage, and a microprocessor which controls the PROM and RAM and does the desired calculations. The decode module also includes control circuitry for controlling the actuatable components in the head, as well as two-way communications circuitry 58 for communicating with a remote host computer. The host computer includes a large database that provides information relating to the decoded symbol. For example, the host computer can provide retail price information corresponding to the decoded symbols.

The typical operation of the scanning system is disclosed as follows: The gun-shaped head is grasped by its handle portion, and its barrel is aimed at the target bar code symbol to be scanned/read. The trigger switch 34 on the head is then depressed, thereby causing the microprocessor to energize the laser, the photodetector, the scanner, and all the electronic circuitry provided on the printed circuit board. The laser emits a light beam, which is then routed through the optical components, and thereupon, the laser beam is swept through the scan window 28 and out of the head past the front region of the body portion of the scanner. After the light beam impinges on a target bar code symbol, the light beam is reflected back towards the front region of the scanner and the beam passes through the converging lens 53 and is converged toward the photodetector 54 to be subsequently processed by the signal processing circuitry 55. The processed signal is directed to the decode module 57 for decoding. The decode module can be located remotely from the head.

A battery 60 is replaceably mounted in the handle portion behind the rear door 36. Another printed circuit board 62 is mounted inside the handle and preferably supports voltage regulator circuitry.

The main board 59 is supported by an internal chassis 64 on which the keypad 24 is supported at an elevated rear extension, as well as a display 66, preferably an LCD screen, visible through the display window 26 and supported on the front of the chassis 64. The scan engine 38 is supportably suspended below the chassis.

The chassis 64 is constituted of a glass fiber-reinforced synthetic plastic material that is highly resistant to inpact forces. As best shown in FIG. 1A, the lower part 22 has mounting holes 80 through which mounting screws 82 extend with clearance to threadedly engage tapped bores 84 within posts 86 extending downwardly from the chassis 64. In the event that the hand-held device is forcefully laid down on a counter top, or is dropped to the floor, the outwardly bulging gasket 20, the upper footing 30 and the lower footing 32 serve as shock absorbers to dissipate the impact force. In case the impact force strikes an area of the device not protected by the gasket and the footings, the direct physical, force-transmitting, connection of the chassis 64 to the one-piece handle/lower part via the screws 82 at multiple spaced-apart locations provides for a rugged, impact-resistant construction.

The general operation of the intelligent decision-making laser focus control will now be described with reference to FIGS. 3A–6.

Figure 3A:
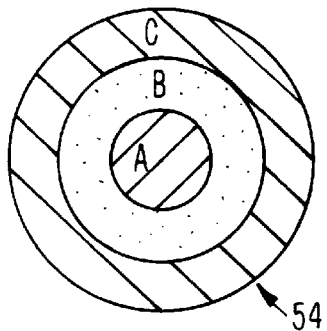
FIGS. 3A–3C represent three possible segmented photodiode configurations used in an embodiment of the present invention.
Figure 3B:
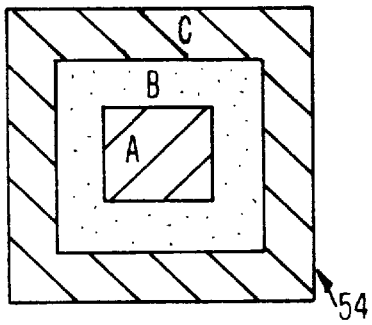
Figure 3C:
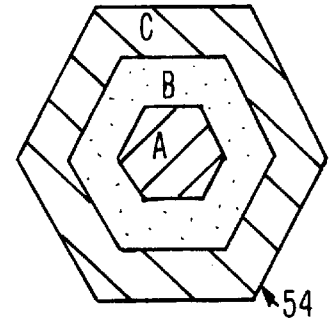

The photodetector 54 disclosed above, preferably includes a segmented photodiode to detect the changes in image size and adjust the laser focus accordingly. Although the preferred embodiment employs annularly or concentrically-ringed (e.g., bull's eye mark) photodiode segments, e.g., A, B, C, the shape of the photodiode segments will depend on a trade-off between cost, accuracy, and manufacturability. Some possible shapes for detecting image growth are shown in FIG. 3A–3C.

Figure 4A:
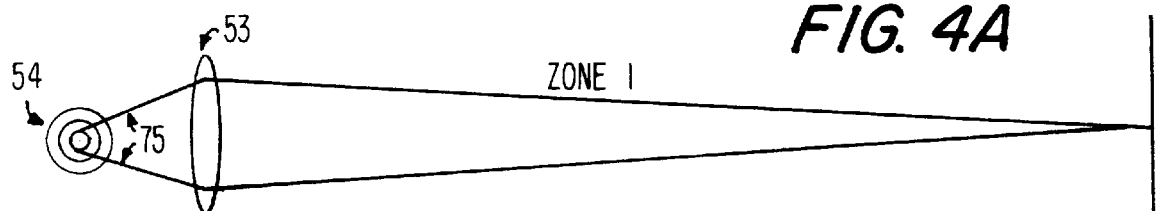
FIGS. 4A–4C represent the interrelationship between zonal distance and segmented photodiode configurations.
Figure 4B:
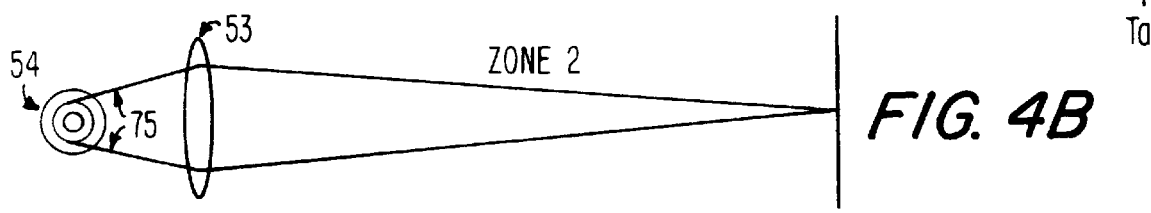
Figure 4C:
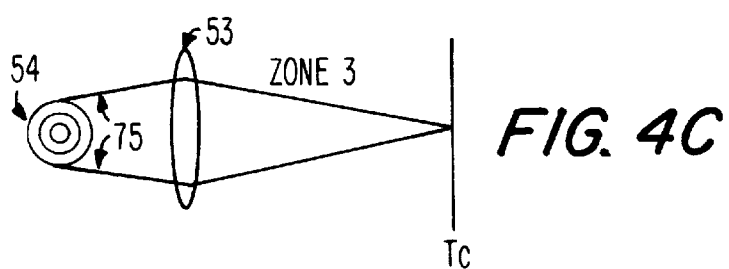

FIGS. 4A–4C illustrates that the number of active segments or rings A, B, and C (shown in FIGS. 3A–3C) on the photodiode 54 will depend on the possible number of range distances or scanning zones that the system may be required to detect. In general, laser focusing can cover large scanning zone distances within a fixed focus. For example, a system, capable of changing laser focus by switching fixed-position apertures or converging lenses in front of the laser, may only require a segmented photodiode with two or three rings.

As stated earlier, the optical focusing element 53 operates to focus the light reflected from the targeted symbol onto the photodetector 54 (or photodiode). The optical focusing element 53, can include, for example, a fixed-position converging lens. In general, for a given converging lens 53, the focal plane of the lens is fixed, so that the further the targeted bar code symbol Ta is disposed from the lens 53, the more acute the focus angles 75 become, and the smaller the area of incidence on the annular segmented photodiode 54. Zones may be predefined for ranges of distances between the target bar code symbol and the optical focusing element 53. As shown in FIG. 4A, the targeted bar code symbol Ta is disposed such that the scanning zone distance is defined as Zone 1, and the converging lens 53 operates to focus the area of incidence within the inner ring of the annular segmented photodiode 54.

Similarly, FIG. 4B demonstrates that the targeted indicia Tb, being positioned closer to the converging lens 53 than targeted indicia Ta, comprises a shorter scanning zone distance Zone 2 than Zone 1. The converging lens 53 provides for focus angles 75 that are larger than in Zone 1. The converging lens 53 therefore focuses on a larger area of incidence to include both the inner and the intermediate ring of the annular segmented photodiode 54.

Finally, FIG. 4C shows that for the closest targeted indicia Tc, the shorter the scanning zone distance Zone 3, the greater the focus angle, thereby yielding the largest area of incidence, to include the inner, intermediate, and outer rings of the annular segmented photodiode 54.

As the light beam reflected from the targeted bar code symbol passes through the fixed-position converging lens 53 and is focused onto the annularly segmented photodiode 54, the photodiode 54, in turn, generates an electrical signal for each ring of the photodiode. The energy level of each-signal will depend on whether the zonal distance is such that the fixed-position converging lens focuses the reflected light beam onto an area of incidence that exposes one or more segmented rings of the photodiode 54 to the reflected light. Upon exposure to the reflected light, each segmented ring is activated and generates a higher energy signal.

Figures 4D, 4E:
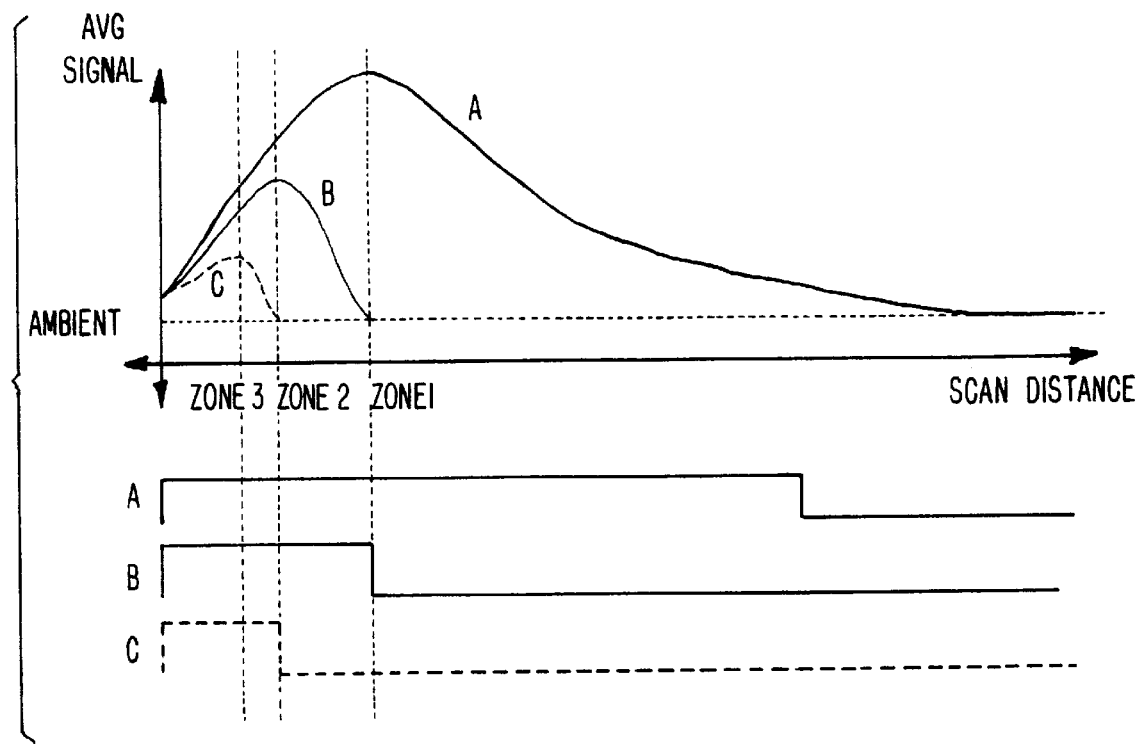
FIG. 4D represents a graph of a typical energy distribution of light on the photodiode segments used.
FIG. 4E represents a zonal logic table, which provides a zone or range for specific combinations of logic values.

The relationship between the electrical signals change and the scanning zonal distance is illustrated by the graph in FIG. 4D, which plots average signal strength as a function of scanning distance. For example, as the distance between the target bar code symbol and the scanner decreases (i.e., from Zone 1 to Zone 2 in FIGS. 4A to 4B), the focused light energy spills, from the inner segmented ring (segment A), to the successive ring (segment B), thereby placing both segmented rings of photodiode 54 in an activated state. The energy incident on the inner ring (segment A) decreases while the energy on the successive rings (segments B and C) increases. At a zonal distance Zone 1, FIG. 4D illustrates that the average amplitude for the electrical signal generated by segment A is at its maximum, indicating that the light energy reflected from the target symbol is totally focused on the inner ring of the photodiode, with no energy spilling over onto a successive ring. Although the amplitude of segment A is greater than the amplitude of segments B and C, the light energy is integrated over the area of incidence, which is the inner ring segment. The zonal distance logic table in FIG. 4E shows that for zonal distance Zone 1, segment A is "ON", and segments B and C are "OFF".

Similarly, at a zonal distance Zone 2, the target symbol is close enough to have the reflected light energy focused upon the inner and intermediate rings, segments A and B, thus generating electrical signals with contributions from a maximally driven segment B and segment A. This is shown in FIG. 4E, as Zone 2 having segments A and B "ON", while segment B is "OFF". At a zonal distance Zone 3, the target symbol is sufficiently close to have the focused light energy spread among the inner, intermediate and outermost rings, and consequently, the electrical signals generated contain contributions from segments A, B, and C. This is shown in FIG. 4E as Zone 3 having segments A, B, and C "ON".

Figure 5:
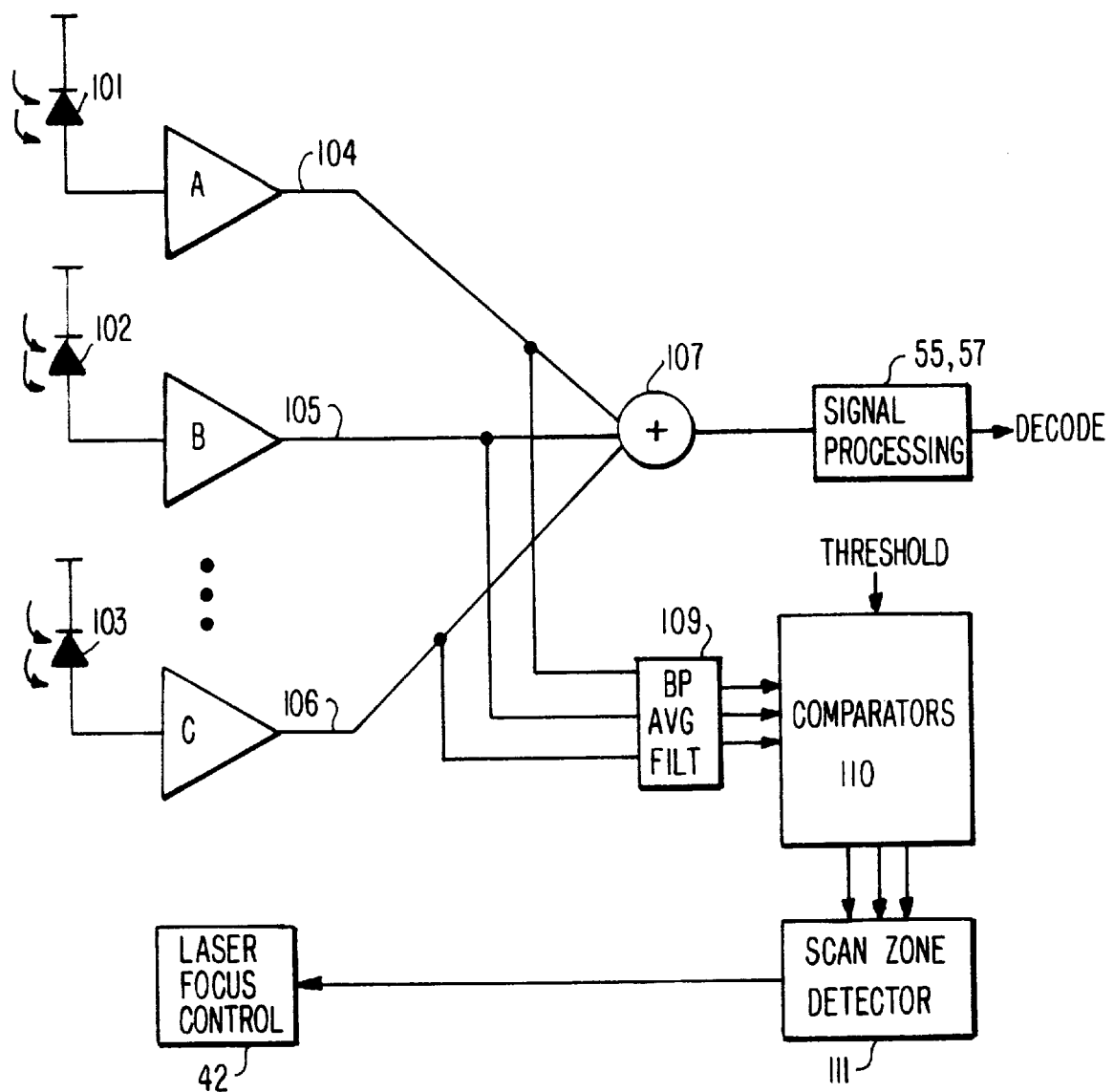
FIG. 5 represents a functional block diagram according to the present invention.

As FIG. 5 illustrates, electrical signals 104, 105, 106 which originate from each of the photodiode segmented rings 101(A), 102(B) and 103(C) are combined by the adder 107. The summed signal is supplied to the standard signal processing circuit 55, 57 for decoding the signals into alphanumeric characters. The electrical signals 104, 105, 106 are also subjected to AC coupling and averaging by an averaging filter 109. As stated above, because the total energy is integrated across the entire segmented photodiode 54, the ambient light energy on each active segmented ring will be similar. As such, the AC coupling will effectively remove the ambient and low frequency noise components, including ambient light energy and the averaging of the signal minimizes the variations on the active areas of the photodiode 54 due to the movement of the image or scanner when the bar code is being scanned.

A comparator 110 then compares the averaged and filtered electrical signals against a noise threshold, and, based on the comparisons, the signals are each assigned a logic level, e.g., "ON" and "OFF", "1" and "0", etc. The assigned logic levels are then fed to a scanning zone detector 111, which operates according to the zonal distance logic table illustrated in FIG. 4E. For a specific set or combination of logic levels rendered by the comparator 110, the scanning zone detector 111 outputs a unique scanning zone distance, representing the range of the targeted symbol.

Before outputting a scanning zone distance, the scanning zone detector 111 also determines when the system has stabilized or settled into a particular scanning zone before furnishing new scanning zone information to update the laser focus controller 42.

Figure 6:
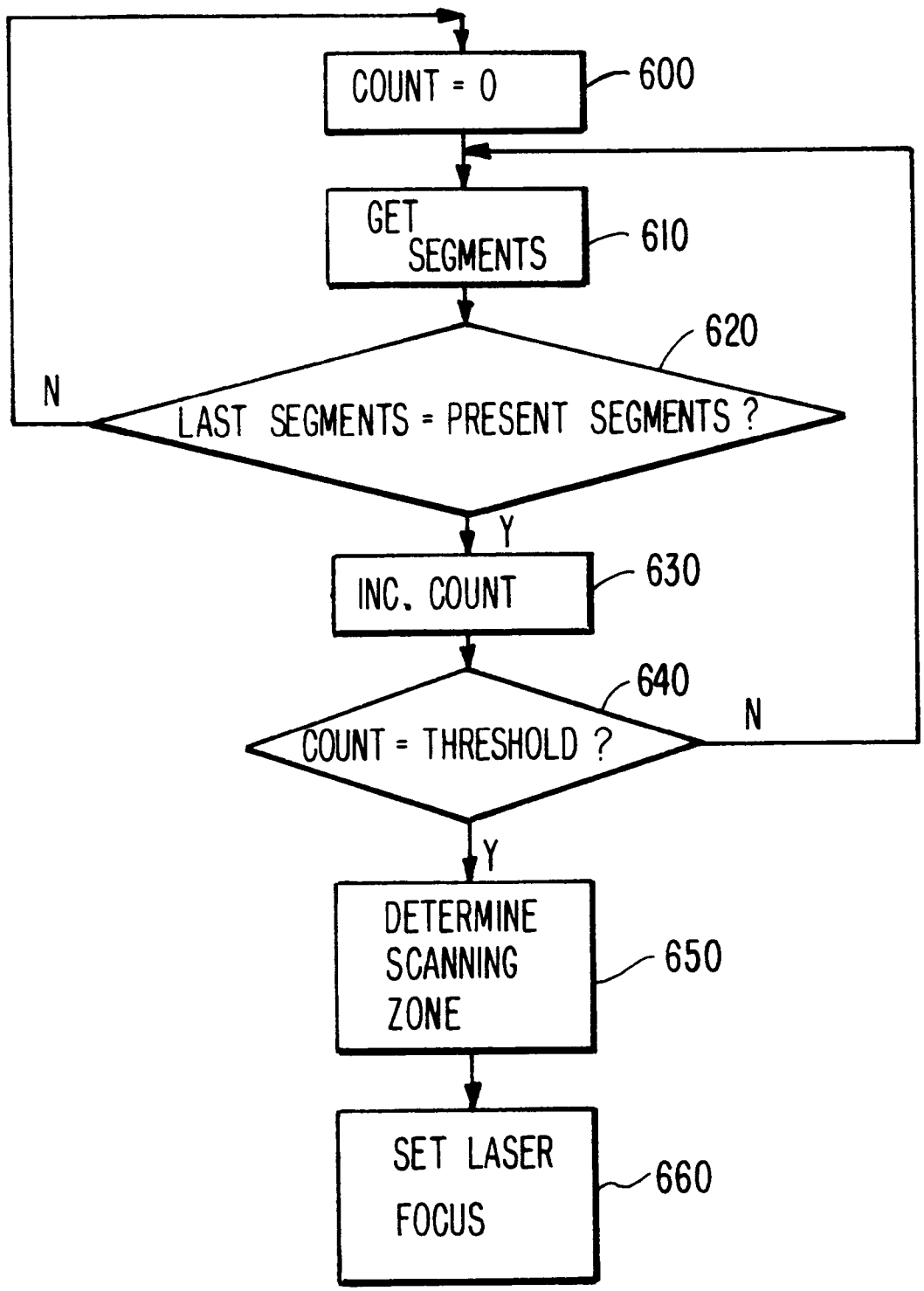
FIG. 6 shows the steps of a logic block settling algorithm according to the present invention.

The scanning zone detecting algorithm, as depicted in FIG. 6, initializes a count to zero (Step 600). The detector fetches the logic level for each segment of the photodiode (Step 610) and determines whether the segment logic levels are the same as the previously read levels (Step 620). If the levels are new, the detector returns back to Step 600 and reinitializes the count. Otherwise, the count is incremented in Step 630. The detector then queries whether the count has reached a predetermined time-out threshold (Step 640). If the detector has not reached the threshold, then the logic levels have not changed since at least the last reading. After the detector has reached the threshold period, the detector uses these settled or stable logic levels to determine the scanning zone distance information (Step 650), by applying, for example, a zonal distance logic table (FIG. 4E) which assigns a zone to a specific set of stable logic levels. The scanning zone distance information is then supplied to the laser focus controller 42, which adjusts the focus of the scanner based on the assigned zone (Step 660). Such a laser focus controller 42 is well known to practitioners in the art, and includes, for example, an optical focus assembly with lens-changing capabilities, slidably driven lenses, and piezo-electric focusing elements.

As seen by the algorithm above, the system performs the settling determination by deeming that after some predetermined time-out threshold period, the photodiode segments have settled into a scanning zone, thereby generating signals that ultimately yield a combination of zone-defining logic levels. The present invention, therefore, provides the intelligent decision-making laser focus control of scanning devices that improves the scanning zone detection response while overcoming the premature focus switching problems of the prior art.

The foregoing description is presented for purposes of illustration and description. It is not intended to be exhaustive or to limit the invention to the precise form disclosed, and modifications and variations are possible in light of the above teachings or may be acquired from the practice of the invention. The embodiments were chosen and described in order to explain the principles of the invention and its practical application to enable one skilled in the art to utilize the invention in various embodiments and with various modifications as are suited to the particular use contemplated. The scope of the invention is defined by the following claims and their equivalents.

We claim:

1. A scanning device comprising:

a light emitting element for directing a scanning light beam towards target indicia for reflection therefrom;

a photodetector for detecting light reflected from the target indicia and for generating a plurality of electrical signals representative of spatial intensity variations of said indicia;

a scanning zone processor for processing the electrical signals and for assigning a logic level to each of said electrical signals;

a scanning zone detector for determining whether said processed signals have substantially stabilized and for assigning a scanning zone distance based on said logic levels; and a focus controller configured to adjust focus of the light emitting element based on said assigned scanning zone distance.

2. The scanning device of claim 1, wherein said photodetector includes a photodiode having a plurality of light detecting segments, each of the segments generating one of the electrical signals.

3. The scanning device of claim 1, further including:

a combiner configured to combine said electrical signals; and a signal processor configured to convert said combined electrical signals into digital signals and to transform the digital signals into alphanumeric characters.

4. The scanning device of claim 1, wherein said scanning zone processor further includes:

a filter for substantially removing ambient energy and low frequency noise components from said electrical signals and for averaging said electrical signals; and a comparator to compare each of the averaged electrical signals to a threshold and to designate ones of the compared signals that are greater than said threshold as a first logic level, and ones of the compared signals that are less than or equal to said threshold as a second logic level.

5. The scanning device of claim 4, wherein said scanning zone detector further includes:

means for comparing said designated logic levels to previously assigned logic levels;

means for determining a predetermined time-out threshold period; and means for assigning a scanning zone distance based on said designated logic levels when the predetermined threshold period has lapsed and said designated logic levels are equal to said previously assigned logic levels.

6. A scanning device comprising:

light emitting means for directing a light beam toward indicia of differing light reflectivity and for reading the indicia:

detecting means for detecting light reflected from the target indicia and for generating a plurality of electrical signals representative of spatial intensity variations of said indicia;

scanning zone processing means for processing the electrical signals and for assigning a logic level to each of said electrical signals;

scanning zone detecting means for determining whether said processed signals have substantially stabilized and for assigning a scanning zone distance based on said logic levels; and focus control means for adjusting focus of the light emitting means based on said assigned scanning zone distance.

7. The scanning device of claim 6, wherein said photodetecting means includes a photodiode having a plurality of light detecting segments, each of the segments generating one of the electrical signals.

8. The scanning device of claim 6, further including:

combining means for combining said plurality of electrical signals; and signal processing means for converting said combined electrical signals into digital signals and for transforming the digital signals into alphanumeric characters.

9. The scanning device of claim 6, wherein said scanning zone processing means further includes:

filtering means for substantially removing ambient energy and low frequency noise components from said electrical signals and for averaging said electrical signals; and comparing means for comparing each of the averaged electrical signals to a threshold and to designate ones of the compared signals that are greater than said threshold as a first logic level, and ones of the compared signals that are less than or equal to said threshold as a second logic level.

10. The scanning device of claim 9, wherein said scanning zone detecting means further includes:

means for comparing said designated logic levels to previously assigned logic levels;

means for determining a predetermined time-out threshold period; and means for assigning a scanning zone distance based on said designated logic levels when the predetermined threshold period has lapsed and said designated logic levels are equal to said previously assigned logic levels.

11. A method of adjusting a focus of a light emitting element directing a scanning light beam toward indicia of differing light reflectivity to read the indicia, comprising the steps of:

detecting light reflected from portions of the indicia;

generating a plurality of electrical signals representative of spatial intensity variations of said indicia;

processing said electrical signals and assigning a logic level to each of said electrical signals;

determining when said processed electrical signals have stabilized;

assigning a scanning zone distance based on said logic levels; and adjusting the focus of said light emitting element based on said assigned scanning zone distance.

12. The method of claim 11, wherein said light detecting step includes the substeps of:

detecting the reflected light using a photodiode having a plurality of light detecting segments; and generating one of the electrical signals from each of the light detecting segments.

13. The method of claim 11, further including:

combining said electrical signals; and converting the combined electrical signals into digital signals and transforming the digital signals into alphanumeric characters.

14. The method of claim 11, wherein said processing step includes the substeps of:

filtering and averaging said electrical signals;

comparing the averaged electrical signals against a threshold; and designating each one of the compared signals as a first logic level when the compared signal is greater than said threshold, and as a second logic level when the compared signal is less than or equal to said threshold.

15. The method of claim 14, wherein said determining step includes the substeps of:

comparing said designated logic levels to previously assigned logic levels;

determining a predetermined time-out threshold period; and assigning a scanning zone distance based on said designated logic levels when the predetermined threshold period has lapsed and said designated logic levels are equal to said previously assigned logic levels.

16. The method of claim 11, wherein said assigning step includes the substep of:

assigning a specific scanning zone distance based on a specific combination of first and second logic levels received from said logic level designating step.

17. A scanning zone distance finding apparatus for a scanning device capable of reading indicia of differing light reflectivity and having a light emitting element directing a scanning light beam towards the indicia, said scanning zone distance finding apparatus comprising:

a photodetector for detecting light reflected from said indicia and for generating a plurality of electrical signals representative of spatial intensity variations of said indicia;

a filter for substantially removing ambient energy and low frequency noise from said electrical signals and for averaging said electrical signals;

a comparator for comparing each of the averaged electrical signals to a threshold and for designating ones of the compared signals that are greater than said threshold as a first logic level, and ones of the compared signals that are less than or equal to said threshold as a second logic level; and a scanning zone detector for assigning a scanning zone distance when a predetermined time-out threshold period has lapsed and said designated logic levels are equal to previously assigned logic levels.

18. A method of finding a scanning zone distance for a scanning device having a light emitting element directing a scanning light beam directed towards indicia of differing light reflectivity and capable of reading the indicia, said method comprising the steps of:

detecting light reflected from said indicia;

generating a plurality of electrical signals representative of spatial intensity variations of said indicia;

filtering and averaging said electrical signals for substantially removing ambient energy and low frequency noise;

comparing each of said averaged electrical signals against a threshold and designating each one of the compared signals that are greater than said threshold as a first logic level, and each one of the compared signals that are less than or equal to said threshold as a second logic level; and assigning a scanning zone distance when a predetermined time-out threshold period has lapsed and said designated logic levels are equal to previously assigned logic levels.

19. A shock-resistant hand-held device for reading bar code symbols, comprising:

a handle portion for manually gripping the device;

a body including a lower body portion of one-piece with the handle portion, an upper body portion, an intermediate body portion located between the upper and lower portions, and a gasket located between the intermediate and lower portions, said body portions bounding an interior;

a chassis mounted within said interior, said chassis being directly connected in force-transmitting relation to the lower body portion;

a scan engine supported by the chassis and including a light source for directing a light beam exteriorly of the body to a bar code symbol to be read, a light detector for detecting light reflected off the symbol over a field of view, and a scanning element for scanning at least one of the light beam and the field of view.

20. The device of claim 19, wherein the gasket extends around the periphery of the body and projects outwardly of the body; and further comprising a first footing on the body, and a second footing on the handle, said footings serving as a support for the device.

* * * * *